United States Patent [19]
Tarumi

[11] Patent Number: 6,115,640
[45] Date of Patent: Sep. 5, 2000

[54] WORKFLOW SYSTEM FOR REARRANGEMENT OF A WORKFLOW ACCORDING TO THE PROGRESS OF A WORK AND ITS WORKFLOW MANAGEMENT METHOD

[75] Inventor: Hiroyuki Tarumi, Tokyo, Japan

[73] Assignee: NEC Corporation, Tokyo, Japan

[21] Appl. No.: 09/008,474

[22] Filed: Jan. 16, 1998

[30] Foreign Application Priority Data

Jan. 17, 1997 [JP] Japan ................................ 9-006848

[51] Int. Cl.[7] ............................ G06F 17/60; G06F 17/30
[52] U.S. Cl. ................................ 700/99; 700/100; 705/8
[58] Field of Search .................... 700/96, 97, 99–101, 700/103, 108, 111; 705/7–9, 11; 707/1–5, 103, 104

[56] References Cited

U.S. PATENT DOCUMENTS

| | | | |
|---|---|---|---|
| 5,301,320 | 4/1994 | McAtee et al. | 705/9 |
| 5,907,829 | 5/1999 | Kida | 705/9 |
| 5,918,226 | 6/1999 | Tarumi et al. | 707/10 |
| 5,974,392 | 10/1999 | Endo | 705/8 |

FOREIGN PATENT DOCUMENTS

| | | |
|---|---|---|
| 7-334572 | 12/1995 | Japan . |
| 8-101862 | 4/1996 | Japan . |
| 8-171521 | 7/1996 | Japan . |
| 8-190584 | 7/1996 | Japan . |

OTHER PUBLICATIONS

Research Reports of the Japan Society for Information Processing, vol. 97, No. 13 (1997–T–30) pp. 92–102 (97–GW–21–16.10).

52nd Conference on Information Processing (First half, 1996) National Conference Proceedings Proceedings (1996–3–6) pp. 6–259–6–260.

Research Reports of the Japan Society for Information Processing vol. 95, No. 13 (1995–1–27) pp. 123–134 (95–GW–9–22, 23).

Tarumi et al., "An Implementation of the Work Web System" *NEC* (1996).

Staffware *Staffware Workflow Pattern 2* (1996).

Swenson, "Visual Support for Reengineering Work Processes" *Collaboration Software, Program Products Division* pp. 130–141 (1993).

Medina–Mora et al., "The Action Workflow Approach to Workflow Management Technology" *The Information Society* 9:391–404 (1993).

*Primary Examiner*—William Grant
*Assistant Examiner*—Kidest Bahta
*Attorney, Agent, or Firm*—Foley & Lardner

[57] ABSTRACT

A workflow system comprises a workflow definition unit, a workflow operation/control unit, and a workflow estimation/prediction unit, the workflow definition unit further includes, as the definition items, rearrangement definition description that is a list of workflow rearrangement algorithms, the workflow estimation/prediction unit further includes a task finish time inquiry unit for examining the finish prediction time of each task, a completion time prediction unit for predicting the completion time of the workflow operation, a definition analytical unit for analyzing the rearrangement definition description, so to supply the analyzed description of rearrangement definition, a rearrangement algorithm library for providing rearrangement algorithms, and a rearrangement unit for, according to the analyzed description of rearrangement definition, taking out a necessary rearrangement algorithm from the rearrangement algorithm library to execute the same.

21 Claims, 13 Drawing Sheets

FIG. 3

```
1 (define-plan'default'((report)))
2 (defline-plan'N03
3         '((alt:to"tarumi")
4          (delay:step"1d":max"5d")
5          (hurry:step"1d":newpri20)
6          (pri:newpri20)))
7 (defline-gim-plan'GOAL1'((force-end:pri20:deadline"1996/12/20 17:00:00")))
```

FIG. 4

| NODE / GOAL | APPLICATION ORDER | ALGORITHM NAME AND PARAMETER |
|---|---|---|
| 'N01 | 1 | report |
| 'N02 | 1 | report |
| 'N03 | 1 | alt:to"tarumi" |
|  | 2 | delay:step"1d":max"5d" |
|  | 3 | hurry:step"1d":newpri20 |
|  | 4 | pri:newpri20 |
| 'GOAL1 | 1 | force-end:pri20:deadline"1996/12/20 17:00:00" |

| POLICY | PARAMETER | APPLICATION ORDER |
|---|---|---|
| REARRANGEMENT ALGORITHM OF NODE N01 | | |
| DELAY IS PERMITTED | MAX=5 DAYS | 3 |
| HURRY THE PRIOR WORKER | MAX=3 DAYS | 2 |
| PUT OFF OTHER WORKS | PRIORITY=10 | 1 |
| REPORT TO A MANAGER | | 4 |

FIG. 10B

| | |
|---|---|
| TITLE NAME | CHIEF |
| PERSON IN CHARGE | YAMADA |
| CONTENT | APPROVED |
| DEADLINE | FROM STARTING THE WORKFLOW [5] DAYS LATER |
| PRIORITY | HIGHEST PRIORITY |
| CHARACTERISTIC | ☐ A LITTLE DELAY MAY BE PERMITTED |
| | ☒ KEEP THE DEADLINE WITHOUT FAIL (1004) |
| | ☐ PRIORITY IS GIVEN TO THIS TASK |
| | ☐ A SUBSTITUTE IS POSSIBLE |
| | SUBSTITUTE NAME : |

FIG. 11

REARRANGEMENT ALGORITHM WHEN PREDICTING THE GOAL
1101 — 'GOAL1' IS NOT ACHIEVABLE

| POLICY | PARAMETER | APPLICATION ORDER |
|---|---|---|
| DELAY IS PERMITTED | MAX=5 DAYS | 3 |
| HURRY THE PRIOR WORKER | MAX=3 DAYS | 2 |
| PUT OFF OTHER WORKS | PRIORITY=10 | 1 |
| REPORT TO A MANAGER | | 4 |

1102

WORKFLOW SYSTEM FOR REARRANGEMENT OF A WORKFLOW ACCORDING TO THE PROGRESS OF A WORK AND ITS WORKFLOW MANAGEMENT METHOD

BACKGROUNDS OF THE INVENTION

1. Field of the Invention

The present invention relates to a workflow system for defining, performing, and controlling the procedure of business works and the flow of the information on the business works, and more particularly, to a workflow system having a function of rearranging the workflow according to the progress of the work.

2. Description of the Related Art

What is called, a workflow system for defining, performing, and controlling the procedure of a series of business works and the flow of the information on the business works among a plurality of workers is used in order to realize the good management of the business works in accordance with the adequate procedure of the works. Provided that a business work is broken into a plurality of unit tasks, a definition of a workflow in a workflow system generally includes the execution order of each task, a person in charge of each task, and the data form passed between tasks. Hereinafter, the whole business works to be performed and controlled based on the workflow is referred to as a workflow operation.

For example, the workflow operation such as handling the slip of traveling expenses may include a first task of issuing a traveling slip, a second task of approving the slip, a third task of reserving tickets or hotels, a fourth task of making the settlement application of the traveling expenses, and a fifth task of accounting according to the settlement application. These tasks are executed in this order. Of these tasks, the first and fourth tasks are the duty of the person who traveled on business, the second task is the duty of a superior of the traveled person, the third task is the duty of a secretary, and the fifth task is the duty of an accountant. The data passed among each task is of the traveling slip.

In the above-mentioned example of the traveling slip, each task is executed one after another. Besides, it is possible to define a conditional branch for executing a predetermined task under a given condition or parallel processing for executing a plurality of tasks in parallel.

Further, the priority may be given to the business works (unit tasks or works with combination of some unit tasks) included in the workflow operation. The priority means the parameter for indicating the priority task among a plurality of tasks being executed. Deadline may be defined in these works. The deadline in every task as well as the final deadline of the workflow operation itself may be defined.

A workflow system for performing works by priority depending on their content is disclosed in, for example, Japanese Patent Publication Laid-Open (Kokai) No. Heisei 8-101862, "Workflow Management Method and System" (Article 1). The Article 1 discloses a workflow system in which, when enormous works are in wait state at a given point of the work, if a new job having arrived newly is a circulation work, the circulation work can proceed into a further advanced process by the priority without waiting for the completion of the circulation work at this point of the work, thereby preventing from delay of works.

FIG. 12 is a block diagram showing the constitution of the conventional workflow system. Workflow clients 1201 are respectively assigned to individual workers, so as to notify the content of a task to each worker and manage the schedule of a task. A workflow server 1200 holds the definition of a workflow operation, controls the progress of the workflow operation, and notifies the occurrence of a task to each workflow client 1201. The workflow server 1200 and the workflow client 1201 may be realized by a work station controlled by a computer program or the other computer system, and the communication therebetween may be realized by various communication means between computer programs. The workflow server 1200 and each workflow client 1201 may be operated on the same hardware, or they may be operated on hardware different from each other. Generally, it is not necessary that the workflow server 1200 and each work flow client 1201 are operating on the respective same hardware continuously from the start of the operation to the end of the operation.

FIG. 13 is an example of a chart expressing the flow of a task in a workflow operation. The illustrated chart shows a plurality of nodes 1301 connected by a plurality of arcs 1302. Each node 1301 represents a worker and a unit task to be done by the worker and each arc 1302 represents the procedure of the work. A method of defining such a chart is disclosed in, for example, Japanese Patent Publication Laid-Open (Kokai) No. Heisei 8-171521, "Method for Constituting a Business Process Support System and Its Apparatus" (Article 2).

The Article 2 discloses a user interface screen for describing a workflow process in the combination of the steps of: document circulation from a person to another person; queuing of a plurality of documents on the way to circulation; division of the queued documents; broadcast of the document to a plurality of circulation destinations after copying the document; collection of the distributed documents by the broadcast in a bundle; and a branch for selecting a circulation path according to the processing result of a document from a worker, controlling the document transfer based on the information on the workflow process, and displaying the components of the workflow process with icons, displaying the transfer of a document between the components with an arrow interconnecting the icons, and further displaying a document to be circulated in the workflow process with an icon, so that the icon indicating the document may be correspondent to the arrow indicating the document transfer between the components.

As examples of the conventional workflow system of this kind, there exist the products such as "Staffware", "ActionWorkflow", and "Regatta".

The outline of the "ActionWorkflow" is described in the report "The ActionWorkflow Approach to Workflow Management Technology" (Article 3) (pp. 391–pp. 404) of the magazine "The Information Society" Vol. 9. The outline of the "Regatta" is described in the report "Visual Support for Reengineering Work Processes" (Article 4) (pp. 130–pp. 141) of the reports published in the "Conference on Organizational Computing Systems" held in Milpitas, Calif., U.S.A. from November 1 to Nov. 4, 1993.

By the way, there is a type of workflow system having a function to deal with a special case when the work does not proceed in time for the deadline initially scheduled. For example, in the above-mentioned "Staffware", a user interface screen for specifying the deadline (time limit) of each worker and action when exceeding the deadline, is prepared and one part of the specifications is published in the home page on the internet http://www.unisys.co.jp/product_info/staffware/pattern2. htm (hereinafter, referred to as Article 5)

as of Oct. 31, 1996. According to the Article 5, however, this function is able to define only the action to be applied in exceeding the deadline, but unable to change the deadline flexibly and take measures beforehand in anticipation of exceeding the deadline.

As an example of the conventional workflow system which performs a necessary amendment during the operation of a workflow, there is a system disclosed in Japanese Patent Publication (Kokai) No. Heisei 7-334572, "Information Processing System" (hereinafter, referred to as Article 6). The Article 6 describes a system which stops the operating workflow when receiving an amendment instruction of the workflow processes during the operation of the workflow, modifies the workflow according to the amendment instruction, and restarts the work from the modified process according to the modified workflow.

Further, as means for altering the workflow operation (rearrangement) in anticipation of troubles in the workflow operation, there is a technique disclosed in Japanese Patent Publication Laid-Open (Kokai) No. Heisei 8-190584, "Workflow System" (hereinafter, referred to as Article 7). FIG. 14 is a block diagram showing the constitution of the workflow system disclosed in the Article 7, FIG. 15 is a block diagram showing the constitution of a workflow estimation/prediction unit 1450, and FIG. 16 is a block diagram showing the constitution of a measure examination unit 1454. The Article 7 at page 10 describes some kinds of trials to rearrangement of a workflow and its application sequence as an example of knowledge provided by a knowledge providing unit 1603 as illustrated in FIG. 16. As a method of workflow rearrangement, described is, by way of example, a method for raising the priority, changing the deadline, and designating a substitute.

The above-mentioned conventional workflow system, however, has such a defect that it cannot meet various requests relative to the rearrangement of a workflow flexibly. Possibly, there may be some workflow operations in which the priority is given to the schedule of a manager who gives a final settlement and the workflow schedule until submission of a document to the manager would be advanced as much as possible. At the same time, there may be other workflow operations in which the delay of the schedule doesn't matter. A method for meeting these various requests is not disclosed even in the knowledge providing means of the workflow system in the Article 7. In other words, the conventional workflow system can't rearrange the workflow flexibly according to the individual requests.

In the conventional workflow systems, a designer of workflow definition can't specify the policy of workflow rearrangement, and the rearrangement in accordance with the intention of the definition designer has been impossible. In order to meet various requests about rearrangement as mentioned above, it is necessary to specify the rearrangement policy for every worker in detail in case of exceeding the deadline or in case of predicting that the deadline may be exceeded. Such a specifying method, however, is not described even in the workflow definition means in the workflow system in the Article 7.

SUMMARY OF THE INVENTION

An object of the present invention is to provide a workflow system capable of flexibly meeting various requests such as advancement of a schedule or specification of a substitute.

Another object of the present invention is to provide a workflow system capable of rearrangement in accordance with the intention of a definition designer.

According to the first aspect of the invention, a workflow system for defining, operating, and controlling the procedure of business works and the flow of the information on the business works, and further rearranging a workflow according to the progress of the work, for a workflow operation realized by the connection of a series of tasks which a plurality of workers are charged with, comprises workflow definition means for generating workflow definition based on various conditions such as the content of the workflow operation, its order, the deadline of each task, the name of a worker in charge, and the priority, workflow operation/control means for controlling the progress of the workflow operation according to the workflow definition generated by the workflow definition means and pressing each worker for the execution of the task, and workflow estimation/prediction means for, upon receipt of the workflow definition and the progress, predicting the future progress of the workflow operation, the workflow definition generated by the workflow definition means includes rearrangement definition description that is a list of workflow rearrangement algorithms to be executed when it is predicted that the deadline of task assigned to a worker is not kept, the workflow estimation/prediction means further includes task finish time inquiry means for examining the finish prediction time of each task, completion time prediction means for predicting the completion time of the workflow operation by the use of the examination result by the task finish time inquiry means, definition analytical means for analyzing the rearrangement definition description defined by the workflow definition means, so to supply the analyzed description of rearrangement definition, a rearrangement algorithm library for providing a plurality of rearrangement algorithms to be listed by the rearrangement definition description, and rearrangement means for, upon receipt of the analyzed description of rearrangement definition, taking out a rearrangement algorithm specified in the analyzed description of rearrangement definition from the rearrangement algorithm library and executing the rearrangement algorithm when the completion time prediction means predicts that the deadline is not kept in some task within the workflow operation.

The workflow operation/control means, upon detecting delay in a task, may specify the task and transfer to the operation by the rearrangement means.

In the preferred construction, a workflow system further comprises organization state store/control means for holding achievement goals relative to the workflow operation, receiving the information on the progress from the workflow operation/control means, making a comparison between the information on the progress and the achievement goals, and controlling the achievement condition of the workflow operation, the rearrangement definition description includes a list of workflow rearrangement algorithms to be executed when the achievement goals are not achieved, the organization state store/control means, when predicting that it is difficult to accomplish the achievement goals, passing the goal name to the rearrangement means, then to transfer to the operation by the rearrangement means, the rearrangement means taking out a rearrangement algorithm specified in the rearrangement definition description from the rearrangement algorithm library to execute the same.

In the preferred construction, when a plurality of rearrangement algorithms are specified together with their application order in the analyzed description of rearrangement definition, the rearrangement means applies the plurality of rearrangement algorithms one after another in the specified order and finishes the operation at the success in one of the algorithms.

In the preferred construction, rearrangement algorithms provided by the rearrangement algorithm library include a rearrangement algorithm for, with respect to a task impossible to keep the deadline, changing an executor of the task to a substitute.

In another preferred construction, rearrangement algorithms provided by the rearrangement algorithm library include a rearrangement algorithm for, with respect to a task impossible to keep the deadline, extending the deadline of the task within a given range.

In another preferred construction, rearrangement algorithms provided by the rearrangement algorithm library include a rearrangement algorithm for, with respect to a task impossible to keep the deadline, raising the priority of the task.

In another preferred construction, rearrangement algorithms provided by the rearrangement algorithm library include a rearrangement algorithm for, with respect to a task impossible to keep the deadline, advancing the request time of the task within a given range so as to keep the deadline and, with respect to tasks prior to the task, rearranging to finish them by the request time of the task advanced so as to keep the deadline.

In another preferred construction, rearrangement algorithms provided by the rearrangement algorithm library include a rearrangement algorithm for, with respect to a task impossible to keep the deadline, advancing the request time of the task within a given range so as to keep the deadline and, with respect to tasks prior to the task, applying geometric reduction to the working period so as to finish them by the request time of the task advanced so as to keep the deadline.

In another preferred construction, rearrangement algorithms provided by the rearrangement algorithm library include a rearrangement algorithm for, with respect to a task impossible to keep the deadline, informing the occurrence of a problem to a workflow management person.

Also, rearrangement algorithms provided by the rearrangement algorithm library include a rearrangement algorithm for setting the deadline of the last task of the workflow operation at a specified time and applying geometric reduction to the working period of a series of tasks from the task operating now to the last task.

Also, the workflow definition means provides an interface capable of specifying each rearrangement algorithm, with the key words of natural languages to express its characteristic over the workflow operation, as means for specifying each rearrangement algorithm provided by the rearrangement algorithm library.

Also, the workflow definition means provides an interface capable of specifying a plurality of rearrangement algorithms together with the application order, as means for specifying each rearrangement algorithm provided by the rearrangement algorithm library.

According to the second aspect of the invention, a workflow management method for defining, operating, and controlling the procedure of business works and the flow of information on the business works, and further rearranging a workflow according to the progress of the work, for a workflow operation realized by the connection of a series of tasks which a plurality of workers are charged with, comprising the steps of:

a) a step of generating workflow definition based on various conditions such as the content of the workflow operation, its order, the deadline of each task, the name of a worker in charge, and the priority;

b) a step of controlling the progress of the workflow operation according to the workflow definition generated by the workflow definition step and pressing each worker for the execution of the task; and c) a step of, upon receipt of the definition and the progress, predicting the future progress of the workflow operation, the workflow definition generated by the workflow definition step a) includes a rearrangement definition description that is a list of workflow rearrangement algorithms to be executed when it is predicted that the deadline of a task assigned to a worker is not kept, the step c) further including:
a step of examining the finish prediction time of each task;
a step of predicting the completion time of the workflow operation by the use of the examination result by the task finish time inquiry step;
a step of analyzing the rearrangement definition description defined by the workflow definition step, so as to supply the analyzed description of rearrangement definition; and
a step of, upon receipt of the analyzed description of rearrangement definition, taking out a rearrangement algorithm specified in the analyzed description of rearrangement definition from a rearrangement algorithm library for providing a plurality of rearrangement algorithms to be listed by the rearrangement definition description, and executing the rearrangement algorithm, when it is predicted in the completion time prediction step that the deadline is not kept in some task during the workflow operation.

In the preferred construction, the step b), upon detecting delay in a task, specifies the task and transfers to the operation by the executing step of the rearrangement algorithm.

In the preferred construction, a workflow management method further comprises d) a step of holding achievement goals relative to the workflow operation, receiving the information on the progress from the step b), making a comparison between the information on the progress and the achievement goals, and controlling the achievement condition of the workflow operation, the rearrangement definition description includes a list of workflow rearrangement algorithms to be executed when the achievement goals is not achieved, the step d), when predicting that it is difficult to accomplish the achievement goals, passing the goal name to the executing step of the rearrangement algorithm, then to transfer to the operation by the executing step of the rearrangement algorithm, the executing step of the rearrangement algorithm taking out the rearrangement algorithm specified in the rearrangement definition description from the rearrangement algorithm library and executing the rearrangement algorithm.

In the preferred construction, when a plurality of rearrangement algorithms are specified together with their application order in the analyzed description of rearrangement definition, the executing step of the rearrangement algorithm applies the plurality of rearrangement algorithms one after another in the specified order and finishes the operation at the success in one of the algorithms.

According to another aspect of the invention, a computer readable memory having a computer program for controlling a workflow system for defining, operating, and controlling the procedure of business works and the flow of information on the business works, and further rearranging the workflow according to the progress of the work, for a workflow operation realized by the connection of a series of tasks which a plurality of workers are charged with, the computer program comprising the steps of:

a) a step of generating workflow definition based on various conditions such as the content of the workflow operation, its order, the deadline of each task, the name of a worker in charge, and the priority;

b) a step of controlling the progress of the workflow operation according to the workflow definition generated by the workflow definition step and pressing each worker for the execution of the task; and c) a step of, upon receipt of the definition and the progress, predicting the future progress of the workflow operation, the workflow definition generated by the workflow definition step a) includes a rearrangement definition description that is a list of workflow rearrangement algorithms to be executed when it is predicted that the deadline of task assigned to a worker is not kept, the step c) further including:

a step of examining the finish prediction time of each task;

a step of predicting the completion time of the workflow operation by the use of the examination result by the task finish time inquiry step;

a step of analyzing the rearrangement definition description defined by the workflow definition step, so as to supply the analyzed description of rearrangement definition; and a step of, upon receipt of the analyzed description of rearrangement definition, taking out a rearrangement algorithm specified in the analyzed description of rearrangement definition from a rearrangement algorithm library for providing a plurality of rearrangement algorithms to be listed by the rearrangement definition description, and executing the rearrangement algorithm, when it is predicted in the completion time prediction step that the deadline is not kept in some task during the workflow operation.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 3 is a view showing an example of description of rearranging definition for use in the embodiment.

FIG. 4 is a view showing an example of analyzed description of rearrangement definition for use in the embodiment.

FIG. 10B is a view showing another example of a window for rearrangement algorithm definition for use in the graphic interface of FIG. 9.

FIG. 11 is a view showing an example of a window for defining the rearrangement algorithm in anticipation of non-achievable goal, for every goal, for use in the graphic interface of FIG. 9.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instances, well-known structures are not shown in detail in order to avoid unnecessarily obscuring the present invention.

Figure 1:
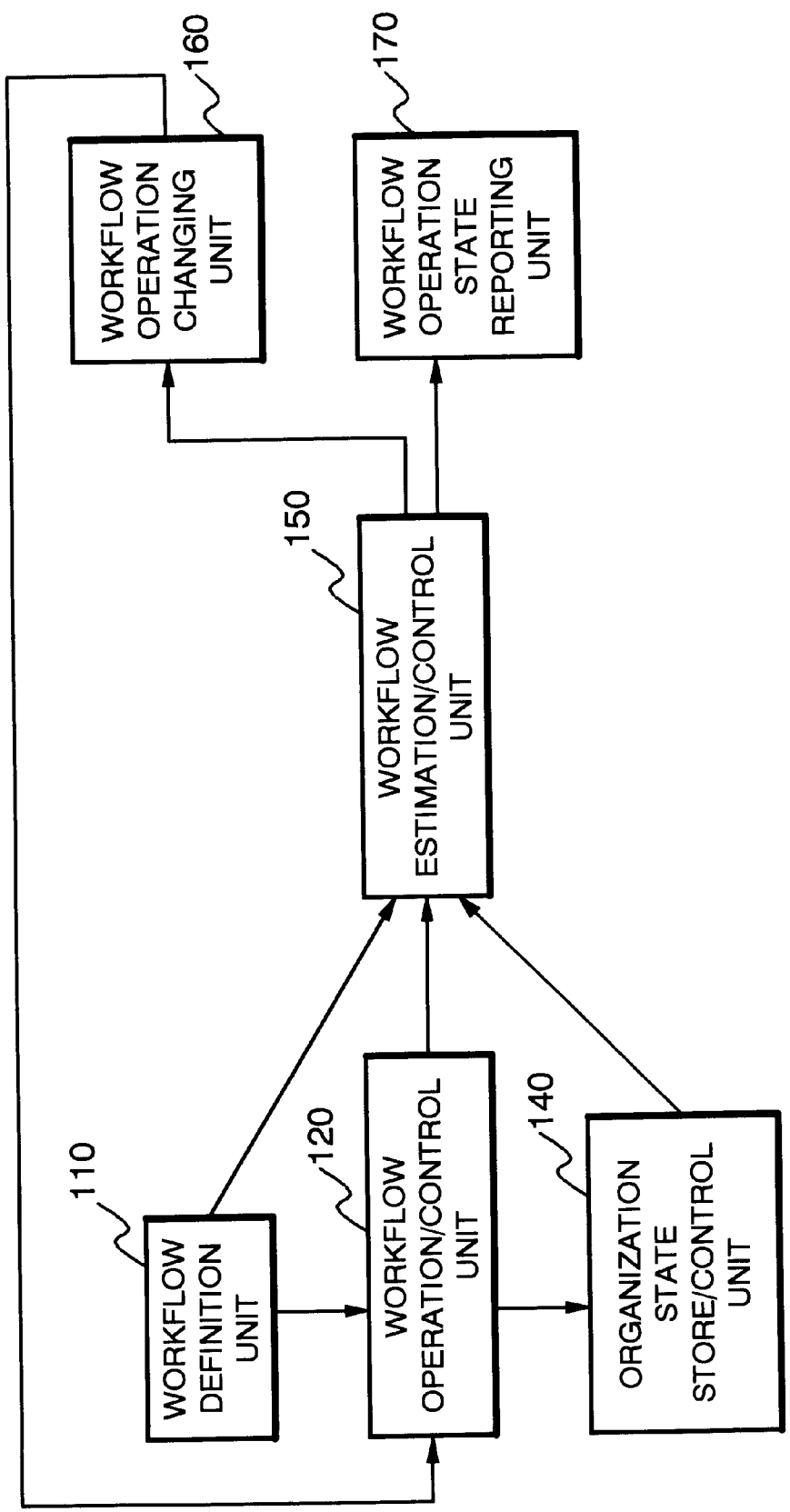
FIG. 1 is a block diagram showing the constitution of a workflow server of a workflow system according to an embodiment of the present invention.
Figure 12:
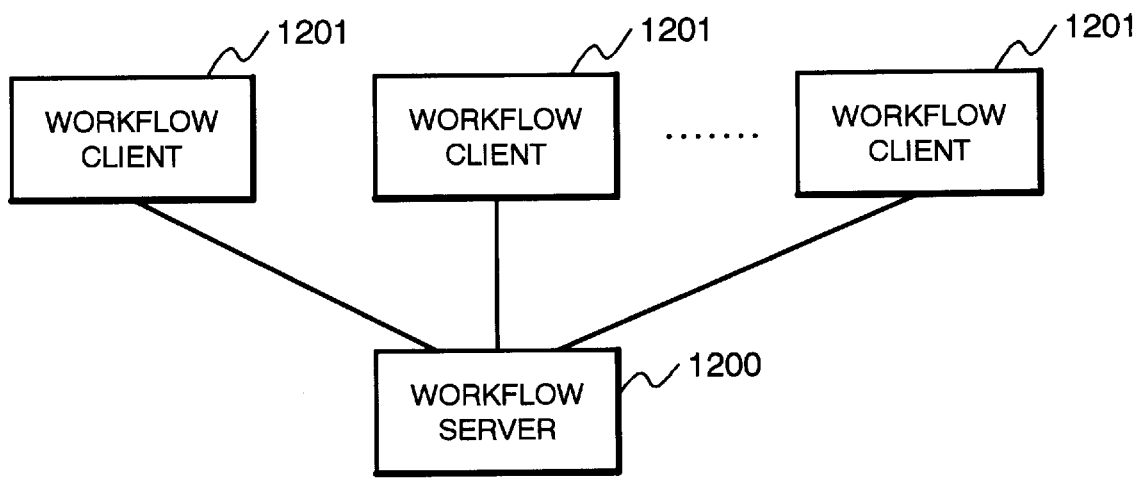
FIG. 12 is a block diagram showing the constitution of the conventional workflow system.
Figure 13:
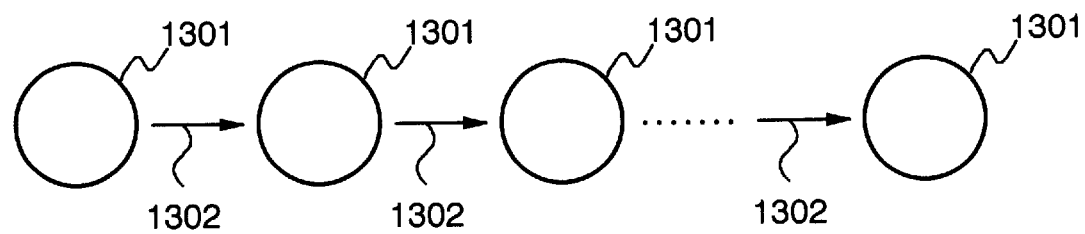
FIG. 13 is a chart to express the flow of the workflow operation.
Figure 14:
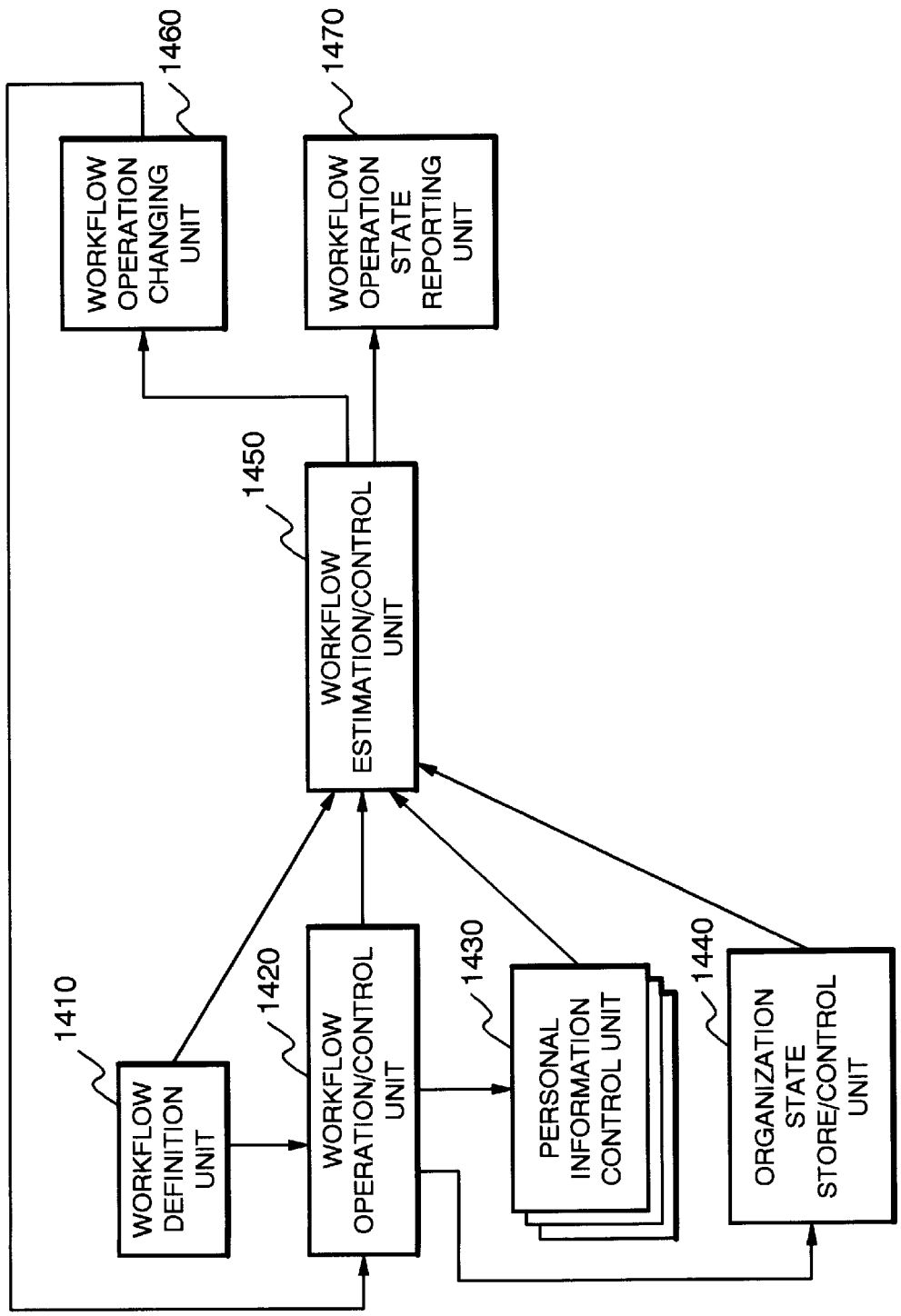
FIG. 14 is a block diagram showing the constitution of a workflow server of the conventional workflow system.
Figure 15:
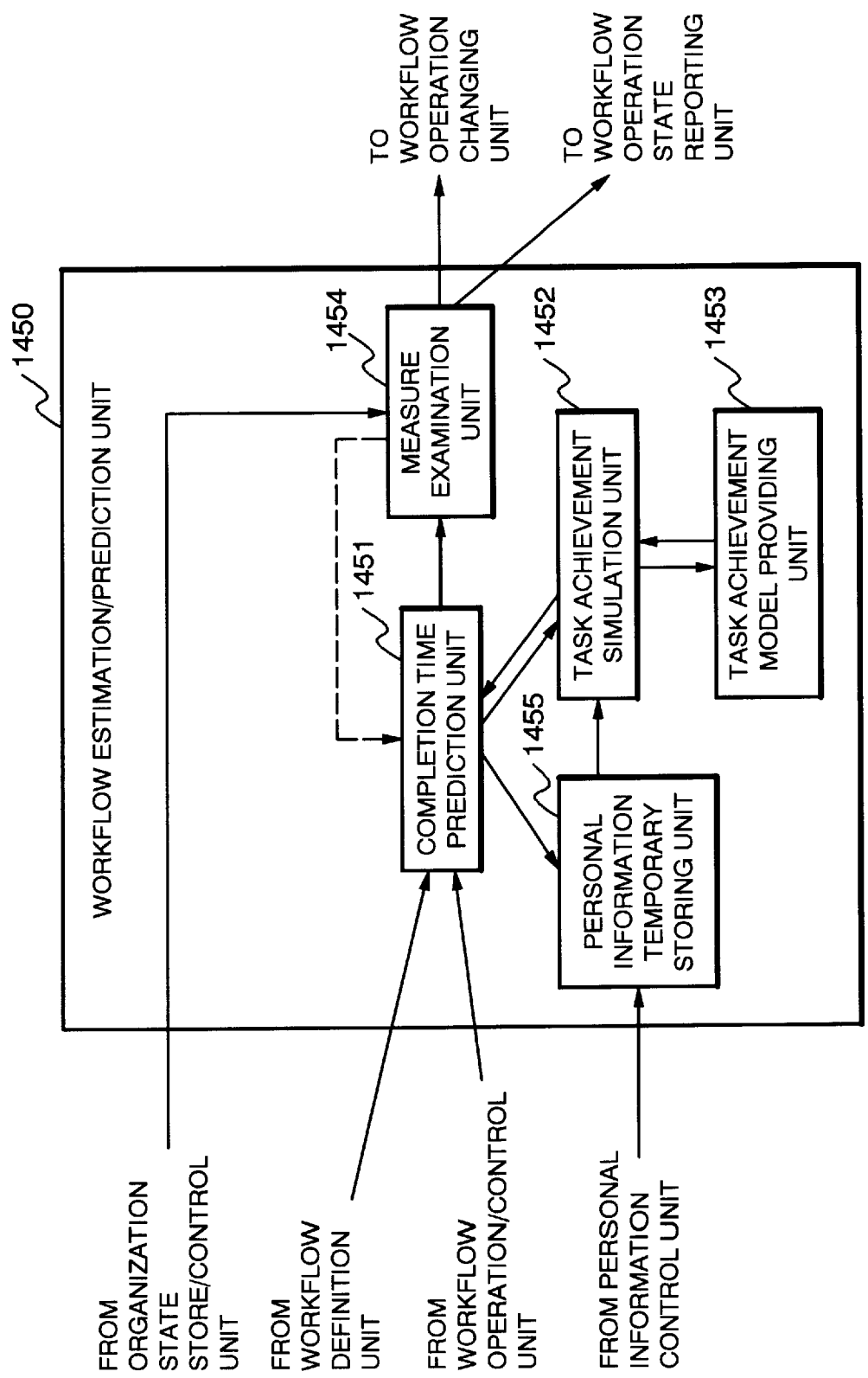
FIG. 15 is a block diagram showing the constitution of a workflow estimation/prediction unit in the workflow server of FIG. 14.
Figure 16:
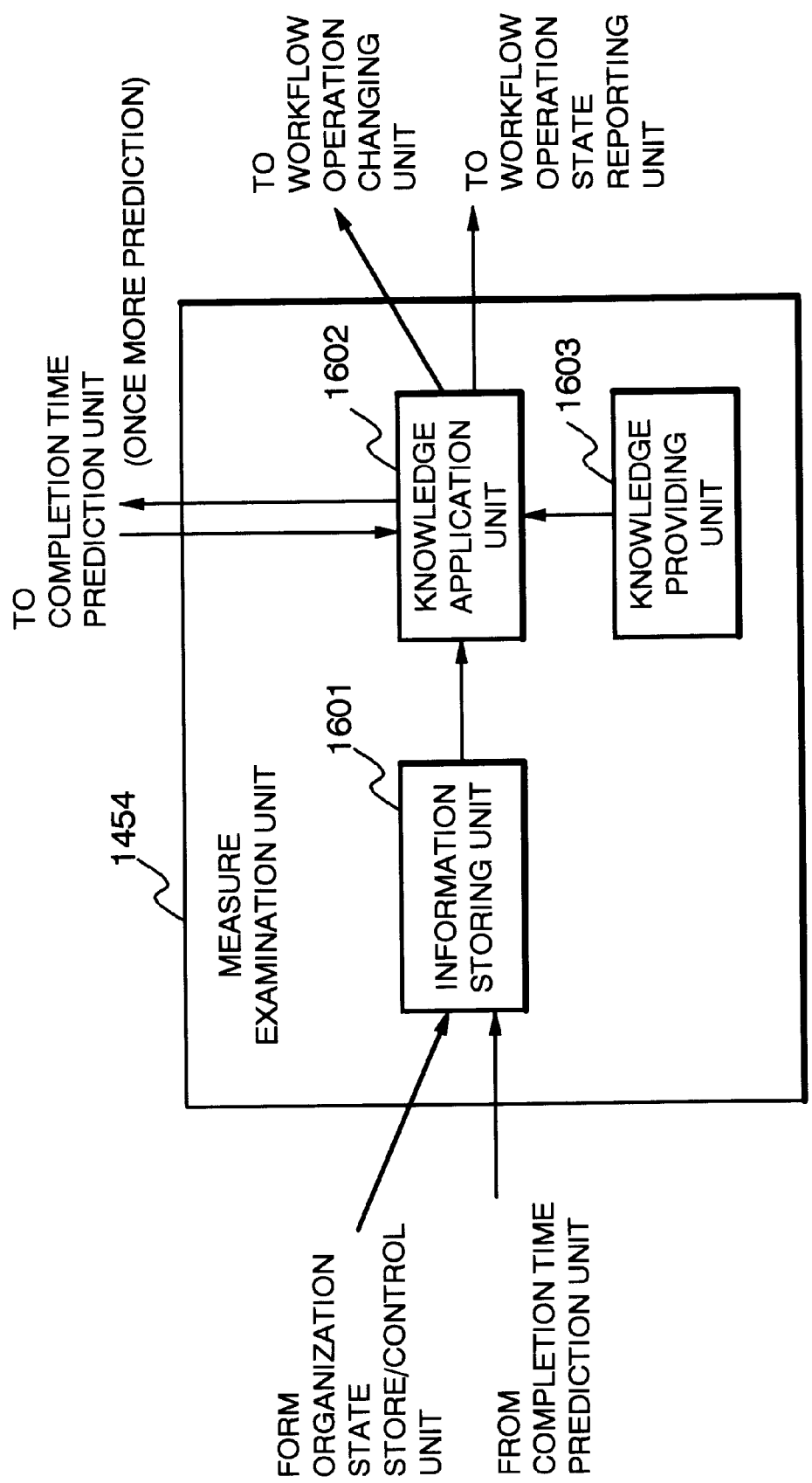
FIG. 16 is a block diagram showing the constitution of a measure examination unit in the workflow estimation/prediction unit of FIG. 15.

FIG. 1 is a block diagram showing the constitution of a workflow server of a workflow system according to the present invention. The workflow server illustrated in FIG. 1 corresponds to the workflow server 1200 of the workflow system illustrated in FIG. 12. As illustrated in FIG. 1, the workflow server of the embodiment comprises a workflow definition unit 110, a workflow operation/control unit 120, an organization state store/control unit 140, a workflow estimation/prediction unit 150, a workflow operation changing unit 160, and a workflow operation state reporting unit 170. FIG. 1 shows only the characteristic components of the embodiment, and the description of the other general components is not shown there. For example, although a personal information control unit 1430 is included in the components of the conventional workflow system as shown in FIG. 14, the personal information is to be obtained by inquiring about the personal information of the workflow client (referred to 1201 of FIG. 12) and it is not formed as the components of the workflow server in the present invention. However, this difference does not matter in the present invention. This embodiment is also applicable to a workflow system having the personal information provided in the workflow server as shown in FIG. 14.

Each unit for executing each function, of the above components, may be realized by a CPU controlled by a computer program and an internal memory such as a RAM or the like. The computer program is stored in a storing medium such as a magnetic disk, a semiconductor memory, or the other, and each function is executed by loading the program in a work station, a personal computer, or other processing unit. In order to realize a workflow system, it is possible to combine computer programs respectively having a single function for realizing each function executing unit correspondingly to the above-mentioned components, or it is possible to prepare a computer program including functions corresponding to a plurality of function executing units. A workflow system is generally realized on a computer network, but each function executing unit may be realized on any hardware.

The workflow definition unit 110 breaks a work into a plurality of unit tasks, defines activities in every task, the execution order, a person in charge of each task, the deadline thereof, document form to be passed among tasks, and supplies the definition results. The definition results will be referred to as a workflow definition hereinafter. There are various tasks such as entry into the account book, approval, and data calculation on the book. The workflow definition unit 110 defines the priority of each task if necessary. The priority is defined by giving the individual integral value to each task, so that a task with the larger value is processed earlier. In the following description, raising the priority means enlarging the value of the priority, and the high priority means that the value of the priority is large. This way of giving the priority is only an example. On the contrary, the priority may be defined in such a way that the priority becomes higher as the value of the priority becomes smaller, or the value of the priority may be defined by a symbol other than the integer, for example, by a letter.

The workflow operation/control unit 120, upon receipt of the workflow definition from the workflow definition unit 110, circulates a document among persons in charge according to the definition and asks each person each task according to the workflow so that he should keep the time limit of each task. When the priority is defined in each task, the unit 120 controls the task processing according to the priority.

The organization state store/control unit 140 stores the information on the state of work performance in an organization and the information on the policy of work performance and provides them. In the below description, these two kinds of information are put together as organization information. The information on the work performance in the organization, of the organization information, includes the following information.

(1) How many workflow operations have been executed during a predetermined period (for example, the number of slips processed during a given period with respect to the workflow operation of processing the traveling slip).

(2) Which data to be stored especially, of the data which have been passed among some tasks, in the workflow operation which has been processed (in the example of a traveling slip, only the data, for example, on a person who traveled on business, the traveling period, and the traveling destination may be stored).

(3) The state of the workflow operation under processing (in the example of a traveling slip, how many slips are piling up in which person).

This information on the state of the work performance in the organization is obtained by the workflow operation/control unit 120 and stored into the organization state store/control unit 140. The information on the policy of the work performance, which is another information to be stored by the organization state store/control unit 140, includes the following information, by way of example.

(1) The number of tasks to be accomplished during a given period as for a specified workflow operation, or a goal to be accomplished, which is defined by the maximum value and the minimum value as for the number of tasks satisfying a specified condition (in the example of a traveling slip, the number of times of traveling is restrained within 10 or the number of workflow operations as for a specified person is restrained within a given number).

(2) A goal to be accomplished as for the value obtained by converting the data by a given function, with respect to the data stored according to the information (2) of the above-mentioned information on the state of the work performance (in the example of a traveling slip, in order to restrain the total of the traveling expenses during a given period within 500,000 yen, the value of the composite function, as a goal, of the function f for taking out the items of traveling expenses from each slip and the function g for requiring the total is given by the following expression;

$$g(f(F1), f(F2), \ldots, f(Fn)) <= 500,000 \text{ yen}$$

when each data of the traveling slip is defined as F1, F2, F3, ... Fn.

The information on the policy of the work performance in the organization is manually entered by a user. When there are a plurality of information (goals) on the policy of the work performance, an identifier name is attached to each goal.

The workflow estimation/prediction unit 150 receives the workflow definition from the workflow definition unit 110, the operational state of the workflow operation based on the workflow definition from the workflow operation/control unit 120, and the organization information from the organization state store/control unit 140, respectively. It predicts the future operational state of each workflow and estimates whether the workflow operates normally while keeping the deadline. When the workflow estimation/prediction unit 150 cannot predict that the workflow operation runs normally while keeping the deadline, or it predicts that it is difficult to keep the deadline, the unit 150 tries to change the workflow operation by the use of the workflow operation changing unit 160 or the workflow operation state reporting unit 170.

Figure 2:
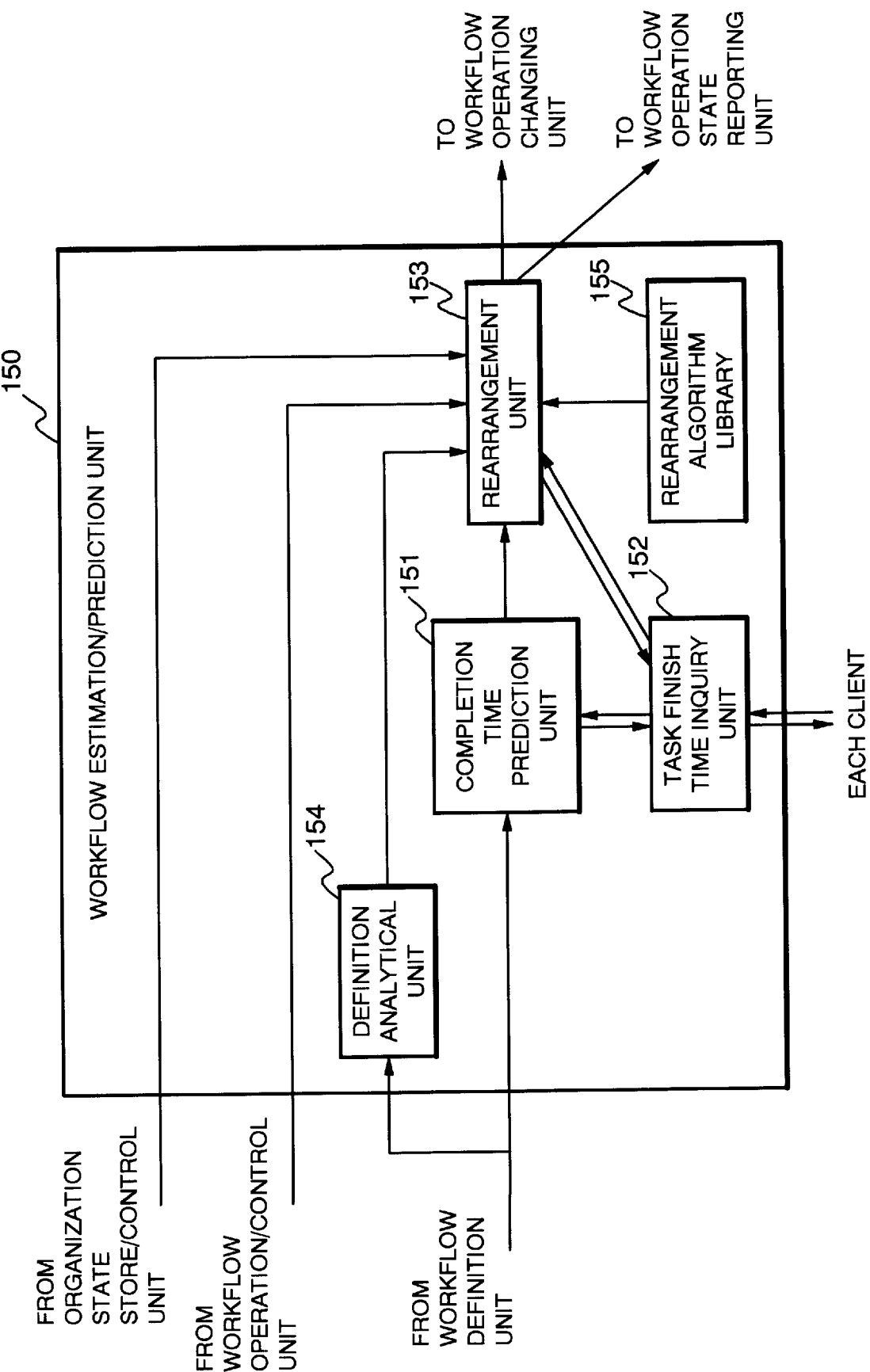
FIG. 2 is a block diagram showing the constitution of a workflow estimation/prediction unit according to the embodiment.

FIG. 2 is a block diagram showing the constitution of the workflow estimation/prediction unit 150. As illustrated in FIG. 2, the workflow estimation/prediction unit 150 includes a completion time prediction unit 151, a task finish time inquiry unit 152, a rearrangement unit 153, a definition analytical unit 154, and a rearrangement algorithm library 155.

The completion time prediction unit 151 receives the workflow definition from the workflow definition unit 110 and makes an inquiry to the workflow client of the corresponding worker by the use of the task finish time inquiry unit 152 in the order of the workers being specified by the workflow definition, to obtain the expected time when each worker will finish each task. According to the obtained information, the unit 151 predicts the finish time of each task and the finish time of the whole workflow operation. This prediction is performed before starting the workflow operation.

The task finish time inquiry unit 152 predicts the occurrence of a workflow task for a workflow client of a worker in charge of each task in reply to the demand of the completion time prediction unit 151, obtains the expected time of finishing the task, and passes it to the completion time prediction unit 151. A general method which has been employed can be used in order to predict the finish time of each task. The conventional technique of this kind has been disclosed, for example, in the report "Realization of a Work Web System" (hereinafter, referred to as Article 8) published in a group ware study session of the Information Processing Society held at the department of technology in Shizuoka University on Jan. 25, 1996. The Article 8 describes a method of planning a workflow operation, that is a management subject, so that it can keep the deadline, asking each personal agent (workflow client) for individual works, and answering the expected time of finishing the work in each personal agent.

When the predicted value of the finish time of each task and the completion time of the whole workflow obtained as mentioned above is later than the deadline of each task specified in the workflow definition, the completion time prediction unit 151 activates the rearrangement unit 153 and delivers the identifier name of the node which is predicted that it cannot keep the deadline to the rearrangement unit 153. When some node occurs that cannot keep the deadline, during a workflow operation, the workflow operation/control unit 120 activates the rearrangement unit 153 and delivers the name of the worker (or any symbol capable of identifying the worker) to the rearrangement unit 153. When some goal cannot be achieved, with reference to the built-in information on the policy of the work performance, the organization state store/control unit 140 activates the rearrangement unit 153 and delivers the identifier name of the goal judged to be non-achievable, to the rearrangement unit 153. To sum up, the rearrangement unit 153 is activated in the following three cases.

(A) When it is predicted that some node cannot keep the deadline, before starting the workflow operation, it is activated, so as to receive the node name from the completion time prediction unit 151.

(B) When some node couldn't keep the deadline during the workflow operation, it is activated, so as to receive the node name from the workflow operation/control unit 120.

(C) When it is impossible to achieve some goal included in the information on the policy of the work performance built in the organization state store/control unit 140, during the workflow operation, it is activated, so as to receive the identifier name of the goal from the organization state store/control unit 140.

The definition analytical unit 154 receives the workflow definition from the workflow definition unit 110, extracts the description relative to the application order of the rearrangement algorithm included in the workflow definition, and delivers it to the rearrangement unit 153 after the analysis. FIG. 3 shows an example of the description (rearrangement definition description) relative to the application order of the rearrangement algorithm. In FIG. 3, the left end portion of each line shows the line number, which is attached for the purpose of explanation as a matter of convenience.

In FIG. 3, <define-plan> of the first and the second lines is to specify which is used for rearrangement, of the rearrangement algorithms supplied from the rearrangement algorithm library 155 described later. <define-plan> has two parameters. A first parameter is to specify a node in the workflow, and a second parameter means the name of a rearrangement algorithm to be applied and a list of parameters to be passed to the algorithm.

The first parameter in the first line is <' default>. This means that the algorithm application order in case of no node being specified by the other <define-plan> should be specified by the second parameter. The second parameter in the first line is <' ((report))>, which specifies that the algorithm <report> should be applied.

In the second line, the first parameter is <' N03>. This means that the rearrangement unit 153 is activated when <define-plan> starting from the second line (to the sixth line) specifies the node <' N03> in the above-mentioned starting condition (A) or (B) of the rearrangement unit 153, indicating that the second parameter is specifying the application order of each algorithm. The second parameters are specified in the third to sixth lines, respectively indicating that each of the four algorithms <alt>, <delay>, <hurry>, and <pri> should be applied one after another together with each specified parameter.

<define-gim-plan> in the seventh line is to specify the application order of algorithm when the rearrangement unit 153 is activated by the above-mentioned starting condition (C) of the rearrangement unit 153. The first parameter <' GOAL1> means the identifier name of a goal, indicating that the algorithm specified by the second parameter should be applied when the goal identified by the name <' GOAL1> cannot be achieved. The second parameter specifies that the algorithm <force-end> should be applied together with the specified parameter.

The description format of FIG. 3 is only an example of the rearrangement definition description. It will do, in the above-mentioned starting conditions (A), (B), and (C) of the rearrangement unit 153, if only the description format includes the identifier name for specifying a node, the algorithm name to be activated, and the application order of parameters to be passed to the algorithm with respect to the conditions (A) and (B), and if only it includes the identifier name of a goal, the algorithm name to be activated, and the application order of parameters to be passed to the algorithm with respect to the condition (C).

The definition analytical unit 154 analyzes the description about the application order of the rearrangement algorithms and passes it to the rearrangement unit 153 as the data (analyzed description of rearrangement definition). The format of this data may be whatever the rearrangement unit 153 can understand. However, it may be generally a list of data on the parameters and the algorithm names arranged in every node and every goal. FIG. 4 shows an example of the analyzed description of rearrangement definition, in which the data to be passed from the definition analytical unit 154 to the rearrangement unit 153 is shown by the table, in the case where the application order of the rearrangement algorithm shown by the description of FIG. 3 is applied to the workflow definition including three nodes of <' N01>, <' N02>, and <' N03>. The data shown in this table means as follows.

The algorithm <report> is applied to <' N01> and <' N02>.

Four kinds of algorithms are applied to <' N03> in turn together with the given parameters, and at the time of succeeding in one of the algorithms, the operation stops.

The algorithm <force-end> is applied to <' GOAL1> together with the given algorithm.

This time, the description will be made about the rearrangement algorithm library 155. The rearrangement algorithm library 155 provides the rearrangement unit 153 with the procedure program of the workflow rearrangement. Each algorithm is provided as a function for designating the value of either success or failure. These algorithm include, for example, <alt>, <delay>, <pri>, <hurry>, <report>, and <force-end>. The individual description will be made as follows. <alt> is to ask a substitute for a task corresponding to the node when a problem has occurred at a node (hereinafter, referred to as a problem node). The substitute may be specified by the parameter <: to>, or it may be defined beforehand in the workflow definition.

For example, a simple description of alt is to ask a substitute defined beforehand in the workflow definition.

The description of alt to: tarumi, is to ask the substitute specified by the character string <tarumi>. When no substitute is defined and the substitute refuses the request, <alt> becomes a failure, and in the case other than this, <alt> becomes a success. When asking a substitute, the priority and the deadline of the task corresponding to the node will not be changed.

Figure 5:
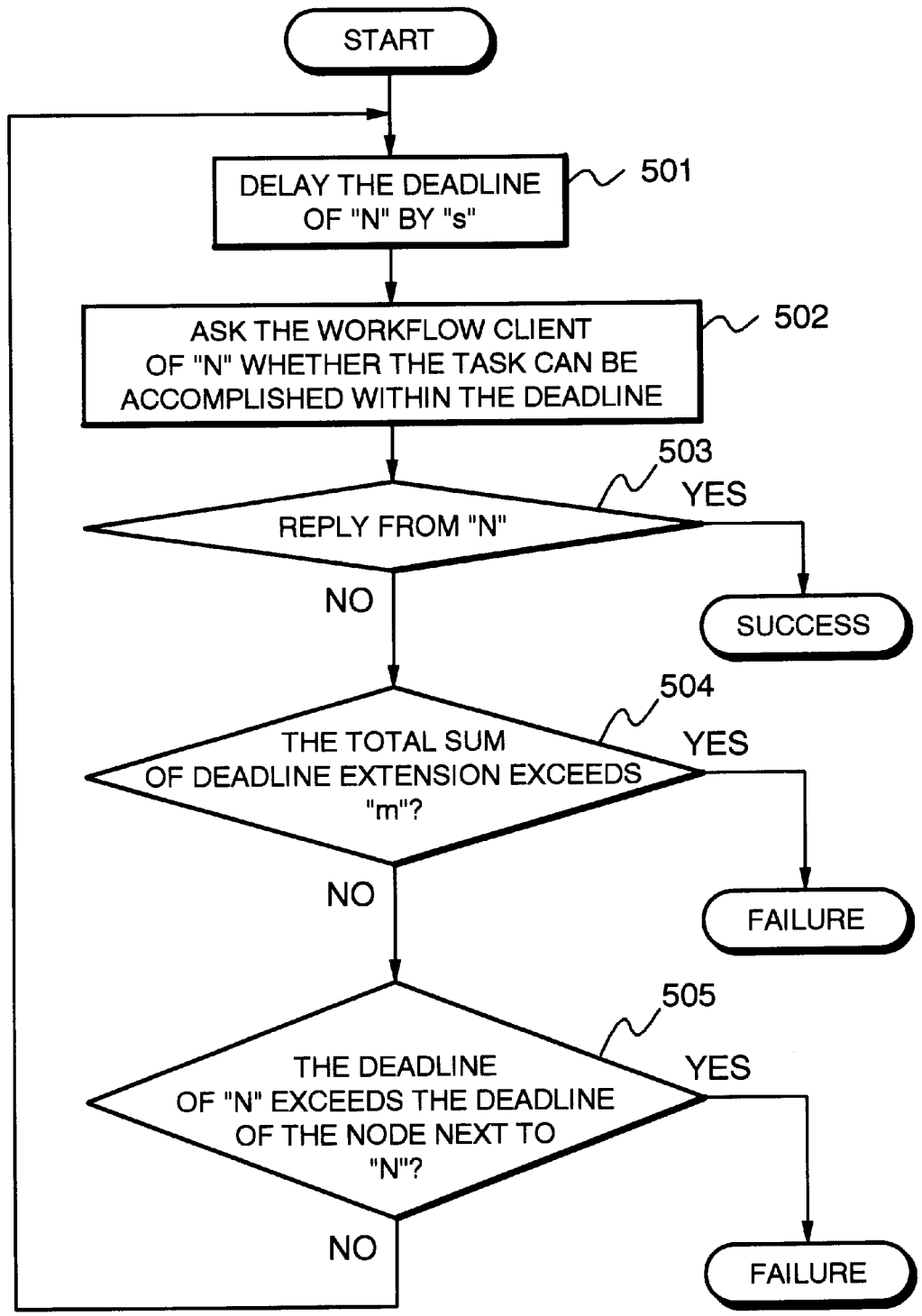
FIG. 5 is a flow chart showing the outline of the operation of the algorithm <delay>.

<delay> includes two parameters; <:step> and <:max>. For the parameters <:step> and <:max>, "d" (day) and "h" (hour) can be used as the unit. For example, the value <5d> means five days. FIG. 5 is a flow chart showing the outline of the operation of the algorithm <delay>. Assume that a problem node is defined as "N", the value of <:step> is defined as "s", and that the value of <:max> is defined as "m". The deadline of the task at the node "N" is postponed by "s" (Step 501). Then, an inquiry is made to "N" whether the task can be achieved within this deadline (Step 502). Speaking more correctly, the inquiry is made to a worker "N" through a workflow client of the worker in charge of the task of the node "N". The task finish time inquiry unit 152 is used for the inquiry. If the answer from "N" is YES, <delay> is successful (Step 503). If the answer from "N" is NO, when the sum total of the deadline extension is not beyond "m" (Step 504) and within the deadline of the node next to "N" (node to be operated next in the workflow definition after receiving the result of the task operation at the node "N"), the operation will return to Step 122 (Step 505). When the deadline extension is beyond "m" in Step 504, or when the deadline of "N" is beyond the deadline of the node next to "N" in Step 504, <delay> is a failure.

As a variation of the algorithm <delay> illustrated in FIG. 5, an algorithm such as delaying the execution schedule of the tasks later than "N" with Step 505 removed therefrom may be considered.

<pri> includes one parameter <:newpri>. <pri> is to change the priority of the task at a problem node into the value indicated by the parameter <:newpri> and inquire the workflow client of a worker of the problem node whether the task with the new priority given thereto can be completed within the determined deadline. As the result of the inquiry, if the worker will be able to finish the task, <pri> is successful and if he or she won't be able to do, it is a failure.

Figure 6:
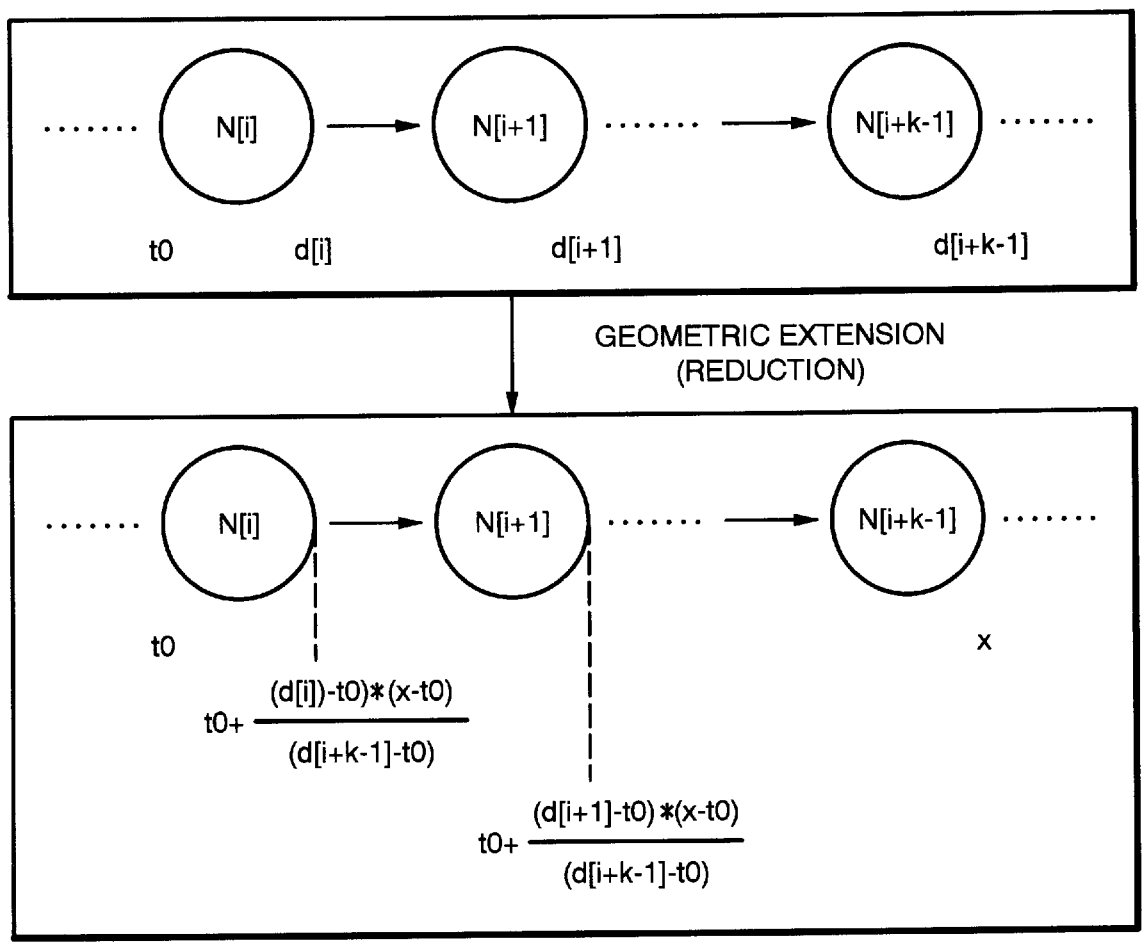
FIG. 6 is a view for use in describing the concept of the geometric extension and the geometric reduction.

This time, before the description about <hurry>, the concept of geometric extension and geometric reduction in the working period will be described. FIG. 6 is a view showing the concept of the geometric extension and geometric reduction. As illustrated in FIG. 6, assume that a part of the workflow consists of k nodes; "N[i]" to "N[i+k−1]", "N[i]" is at the operation at the time t0, and that the deadline of each node is "d[i]" to "d[i+k−1]". Here, if the geometric extension (or geometric reduction) is applied to the working period of the workflow so that the deadline "N[i+k−1]" may become "x", the deadline of "N[j]" shall be changed from "d[j]" to "t0+(d[j]−t0)* (x−t0)/(d[i+k−1]−t0)".

When the working period of the workflow is extended, it is called as a geometric extension, and when the working period of the workflow is reduced, it is called as a geometric reduction.

Figure 7:
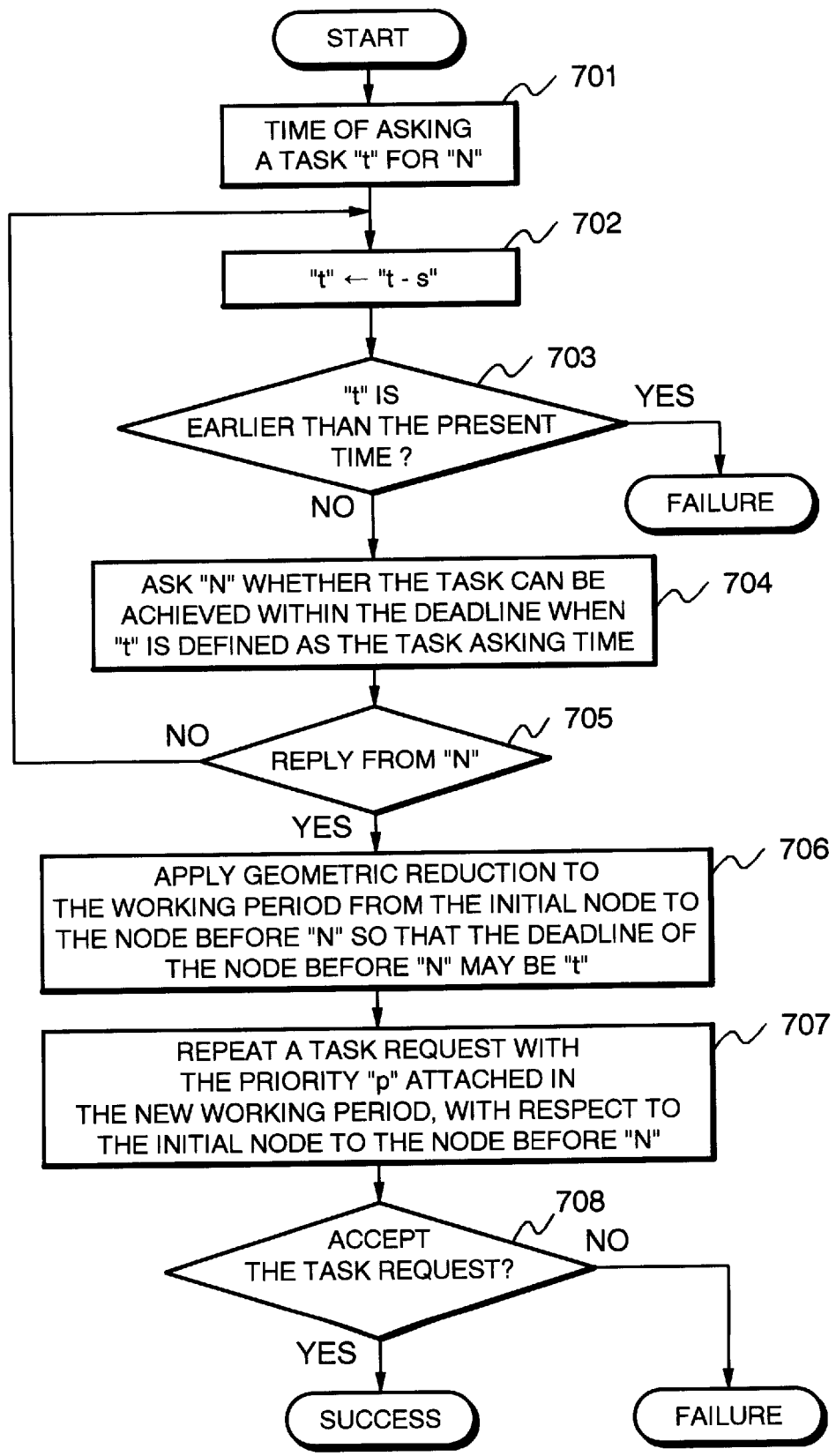
FIG. 7 is a flow chart showing the outline of the operation of the algorithm <hurry>.

<hurry> is applicable only in the case of the condition (A), of the starting conditions (A) to (C) of the rearrangement unit 153. FIG. 7 is a flowchart showing the outline of the operation of the algorithm <hurry>. When the parameter <:step> is defined as "s" and the parameter <:newpri> is defined as "p" in the node "N", the operation of <hurry> is as follows.

The time of asking "N" for a task is more and more advanced by every "s", waiting until "N" accepts the request (Steps 701 to 705). Here, the deadline and the priority are not changed. If the time of asking a task becomes earlier than the present time, <hurry> fails. Next, the geometric reduction is applied to the working period of the workflow from the initial node to the node before "N" so as to ask "N" for a task at the new time "t" of asking a task and a request for a task (prediction) is again repeated (Steps 706 and 707). In this request, the priority is changed to "p". If succeeding in the request for a task, <hurry> is successful, and if failing in the request, <hurry> fails (Step 708).

Strictly speaking, <report> is not a rearrangement algorithm, but it shall be handled in the same way as the other algorithms for the convenience. <report> is not to perform automatic rearrangement, but to report the condition to a manager, thereby waiting for measures by the manager. Who is the manager is defined in the workflow definition. <report> is always successful.

<force-end> includes two parameters; <:deadline> and <:pri>. <:deadline> is to indicate the deadline of the last node. <force-end> is to force the deadline of the task corresponding to the final node of the workflow to be changed into the value of the parameter <:deadline>, apply the geometric reduction to the whole schedule of the workflow, and change the new priority into the value of the parameter <:pri> so as to make a rearrangement. For example, (force-end :pri 20 :deadline "Oct. 22, 1996 17:00:00")

means that the priority should be changed to 20 and that the deadline of the final node should be fixed at 17:00 on Oct. 22, '96.

In the above, the principal examples of the rearrangement algorithms provided by the rearrangement algorithm library 155 have been described. However, the rearrangement algorithms are not restricted to the above-mentioned examples, but, needless to say, new algorithms can be freely added there.

Next, the rearrangement unit 153 will be described. The rearrangement unit 153 is activated in the cases of the above-mentioned starting conditions (A), (B), and (C), so as to receive, for example, the analyzed description of a rearrangement definition as shown in FIG. 4 from the definition analytical unit 154. It receives the rearrangement algorithms from the rearrangement algorithm library 155 to apply them in the order as indicated in the application order. If some algorithm is successful, it instructs the workflow operation changing unit 160 to change the operation according to the new workflow schedule. Only when the algorithm <report> is applied, a workflow manager is reported by the use of the workflow operation state reporting unit 170. If some algorithm is successful, the algorithms that have not been applied will not be applied.

The workflow operation changing unit 160 directly moves the workflow operation/control unit 120 without manual labors and performs the change of the deadline of each task and the other operation changing processing, by the instruction from the rearrangement unit 160 of the workflow estimation/prediction unit 150, according to the above-mentioned rearrangement algorithm.

The workflow operation state reporting unit 170 reports to the effect that the operation is not performed normally, by use of a message means such as E-mail, electric urgent message, voice, and the like, to a manager of the workflow operation, according to the instruction from the rearrangement unit 160 of the workflow estimation/prediction unit 150. Thereafter, the workflow system of the embodiment will wait for the changing operation by the manager.

Figure 8:
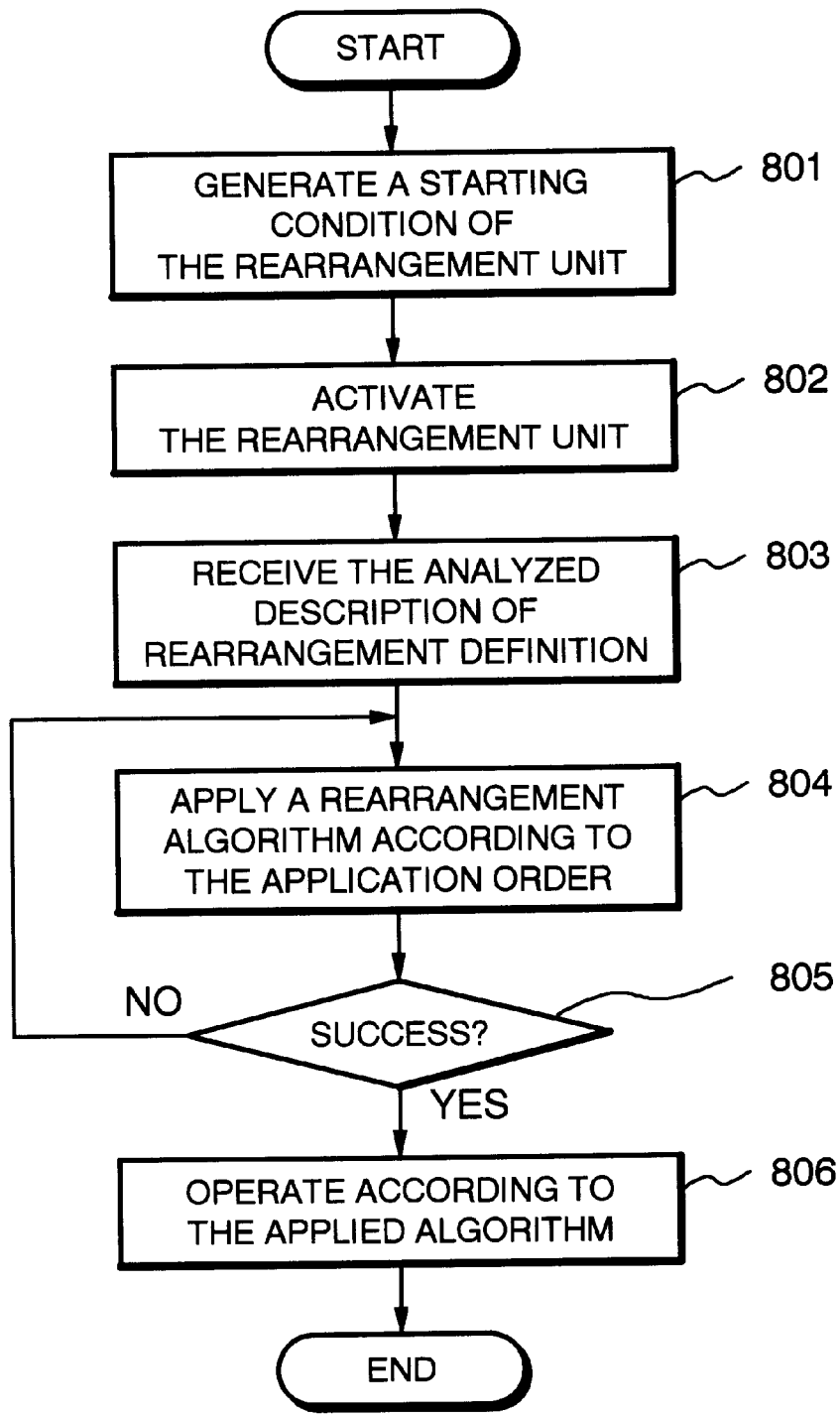
FIG. 8 is a flow chart showing the flow of the workflow changing processing by the workflow estimation/prediction unit 150 according to the embodiment.

The flow of changing operation in the workflow according to the workflow system of thus constituted in the embodiment will be described with reference to the flow chart of FIG. 8. As the premise, in the workflow system of the embodiment, the workflow definition unit 110 creates a workflow definition including description of rearrangement definition, the workflow operation/control unit 120 controls the progress state of the workflow operation according to the workflow definition created by the workflow definition unit 110 and prompts each worker to perform each task, and the workflow estimation/prediction unit 150 estimates the progress state of the workflow operation, thereby operating the workflow.

As described in the above, if one of the starting conditions (A), (B), and (C) of the rearrangement unit 153 is generated in the completion time prediction unit 151 of the workflow estimation/prediction unit 150, in the workflow operation/control unit 120, or in the organization state store/control unit 140 (Step 801), the rearrangement unit 153 is activated and the necessary information is handed to the rearrangement unit 153 (Step 802). The rearrangement unit 153 further receives the analyzed description of rearrangement definition from the definition analytical unit 154 (Step 803) and receives the rearrangement algorithms from the rearrangement algorithm library 155 so as to apply them in the order indicated by the application order (Step 804). At the point of succeeding in some algorithm, the rearrangement unit 153 instructs the workflow operation changing unit 160 to change the workflow operation, or instructs the workflow operation state reporting unit 170 to report the result to the workflow manager (Steps 805 and 806).

As mentioned above, the constitution and the operation of the embodiment have been described. In order to introduce the description of rearrangement definition as shown in FIG. 3 into the workflow definition, it is necessary to provide the workflow definition unit 110 with a function of supplying the description. Hereinafter, the function will be described.

Generally in the workflow definition means, the definition of each node and arc can be performed on the screen by the use of a graphical user interface. Each work name to be assigned to each node can be also specified. Additionally, the workflow definition unit 110 of the embodiment needs the following functions.

(a) Time limit specification function of specifying the time limit of each task at each node (It is necessary that the time can be expressed by the absolute time or the relative time from the workflow operation starting time.)

(b) Rearrangement algorithm definition function at exceeding time limit for, in each node, defining the application order of algorithms activated when it is predicted that a task would not be completed within the time limit or when the task was not actually completed within the time limit and each parameter to be passed to the algorithms.

(c) Rearrangement algorithm definition function in anticipation of a non-achievable goal for defining the application order of rearrangement algorithms activated when it is predicted that each goal cannot be achieved and each parameter to be passed to the algorithms.

Figures 9, 10A:
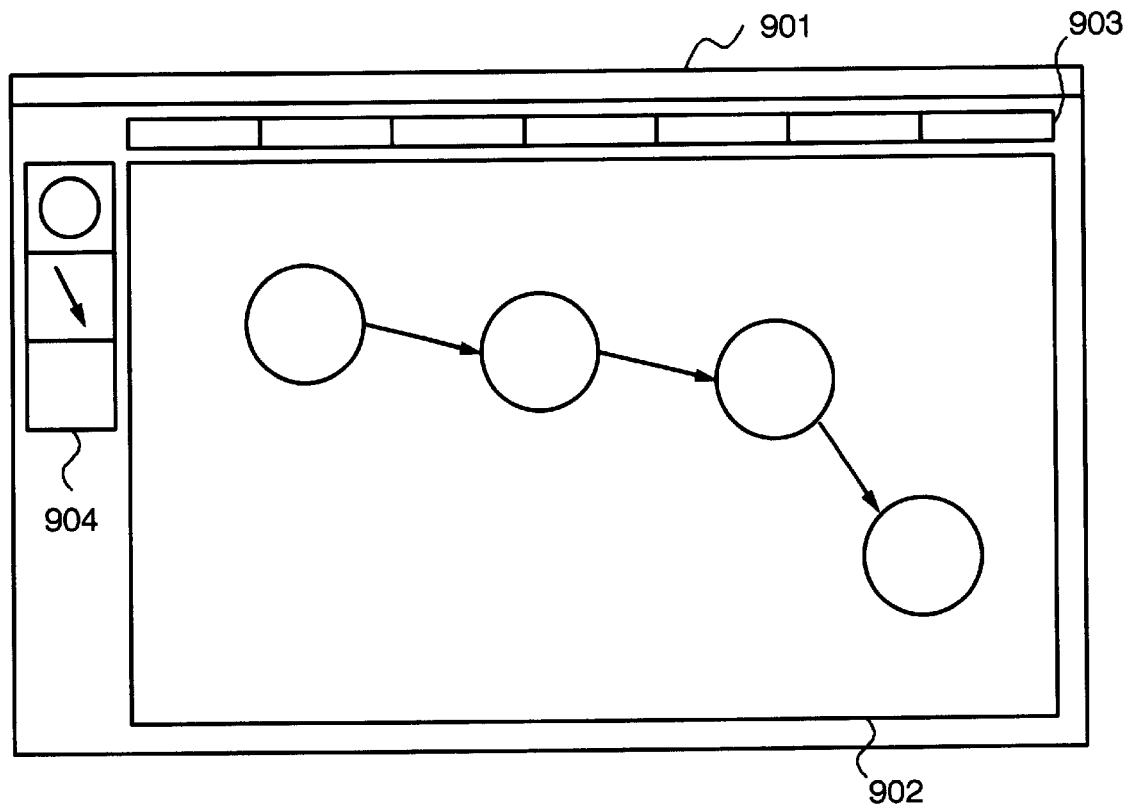
FIG. 9 is a view showing an example of a graphic interface provided by the workflow definition unit according to the embodiment.
FIG. 10A is a view showing an example of a window for rearrangement algorithm definition for use in the graphic interface of FIG. 9.

FIG. 9 is an example of a graphical interface provided by the workflow definition unit 110. With reference to FIG. 9, a window 901 is provided with a chart editing area 902 for editing a workflow chart, menu 903 for selecting edit functions, and a pallet 904 for selecting the components of nodes and arcs to be disposed on a chart. Means for realizing the above-mentioned functions (a) to (c) will be described in the graphical user interface shown in FIG. 9.

As for the function (a), there may be a method of specifying the time limit by selecting the "time limit specification" function from the menu 903 after selecting a desired node on the chart editing area 902. Or, it may be constituted in that another window for entering the attributes of the node (a name of a person in charge, the content of a task of a node, and the like) is popped up by selecting a desired node on the chart editing area 902 and that the time limit is entered into the window as one of the attributes.

As for the function (b), the "rearrangement algorithm definition" function may be selected from the menu 903 after selecting a desired node on the chart editing area 902, similarly to the function (a). Or, another window for entering the attributes of the node may be popped up by selecting a desired node on the chart editing area 902 and further another window for defining a rearrangement algorithm may be popped up by clicking the "rearrangement algorithm definition" button within the popped up window. An example of the window for the rearrangement algorithm definition popped up in this way is illustrated in FIG. 10A.

In FIG. 10A, rearrangement algorithm is defined with the table including three items. In a first item 1001, a rearrangement algorithm is specified. Here, it is expressed by the name easy to understand for a user not by the technical algorithm name such as <delay> or <report>. In the example of FIG. 10A, "Delay is permitted" corresponds to the algorithm <delay>, "Hurry up the prior worker" corresponds to the algorithm <hurry>, "Put off another work" corresponds to the algorithm <pri>, and "Report to a manager" corresponds to the algorithm <report>. In a second item 1002, a parameter to be passed to each algorithm is specified. In a third item 1003, application order is specified. Otherwise, the third item 1003 may be omitted and it may be operated from the top of the table. As illustrated the first line of FIG. 3, it is necessary to define the algorithm application order of default. In order to define this, the same window as FIG. 10A is popped up by selecting the "default rearrangement algorithm" function from the menu 903.

This time, another means for realizing the function (b) will be described. Although a user specifies each parameter and application order of each algorithm in FIG. 10A, such a specification is difficult for an inexperienced person. It is important to provide with a simplified function for definition. For example, in the algorithms which can be specified for each node, one of <delay>, <hurry>, <pri>, and <alt> shall be in the first application order, <report> is always in the second application order, and each parameter uses a fixed value (however, a substitute is specified by a user only as for <alt>). Thereafter, a user shall specify the algorithms with easy expression such as "a little delay is permitted" corresponding to <delay>, "keep the time limit" corresponding to <hurry>, "give priority of this task" corresponding to <pri>, and "a substitute is possible" corresponding to <alt> as the attributes of nodes. An example of this window is shown in FIG. 10B. The window of the drawing is popped up, for example, by selecting a desired node in the chart editing area 902, and it is used in order to edit the attributes of the node. Specification of algorithm is performed by filling a check mark in a check box 1004. Although the priority is expressed by the word such as "the highest priority" in FIG. 10B, this is to be converted into numeric value indicating the priority.

Further, as another means for realizing the function (b), it is also possible that a person who defines a workflow directly describes the rearrangement definition description as shown in FIG. 3, thereby realizing the rearrangement algorithm definition function at exceeding time limit, that is the function (b).

This time, means for realizing the function (c) will be described. Since the definition of a goal and its identifier name have been defined in the organization state store/control unit 140, it has only to define the goal name, the application order of rearrangement algorithms activated when it is predicted that each goal cannot be achieved, and each parameter to be passed to the algorithms, at this stage. Therefore, a user interface for making a definition can be realized by a window as shown in FIG. 11. The window of FIG. 11 is popped up by selecting the function "Rearrangement algorithm specification in anticipation of a non-achievable goal" from the menu 903, a goal name is filled in the goal name space 1101, and algorithms are specified in the rearrangement algorithm definition table 1102 in the same way as FIG. 10A. As for the function (c), it is also possible to provide with an easy user interface for definition similarly to FIG. 10B.

A user interface of the workflow definition 110 is realized as mentioned above. The defined content is converted within the workflow definition unit 110 and the workflow definition description including the rearrangement definition description as illustrated in FIG. 3 is created as its part.

As set forth hereinabove, according to the workflow system of the present invention, it is possible to combine various workflow rearrangement algorithms freely in the rearrangement of a workflow, thereby flexibly dealing with the requests such as advancement of the schedule and specification of a substitute.

Further, a function for specifying the workflow rearrangement algorithm in every node or every achievement goal is included in a function of the workflow definition unit, which enables rearrangement in accordance with the intention of a person who creates the definition.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the features set out in the appended claims.

What is claimed is:

1. A workflow system for defining, operating, and controlling the procedure of business works and the flow of information on the business works, and further rearranging a workflow according to a progress of the work, for a workflow operation realized by a connection of a series of tasks to which a plurality of workers are charged with, comprising:

workflow definition means for generating a workflow definition based on various conditions including at least one of the content of the workflow operation, its order, the deadline of each task, the name of a worker in charge, and the priority;

workflow operation/control means for controlling the progress of the workflow operation according to the workflow definition generated by said workflow definition means and pressing each worker for the execution of the task; and workflow estimation/prediction means for, upon receipt of the workflow definition and the progress, predicting the future progress of the workflow operation, wherein the workflow definition generated by said workflow definition means includes a rearrangement definition description having a list of workflow rearrangement algorithms to be executed when it is predicted that the deadline of a task assigned to a worker is not kept, and wherein said workflow estimation/prediction means further includes:

task finish time inquiry means for examining a finish prediction time of each task;

completion time prediction means for predicting a completion time of the workflow operation by the use of examination results from said task finish time inquiry means;

definition analytical means for analyzing the rearrangement definition description defined by said workflow definition means and supplying an analyzed description of the rearrangement definition;

a rearrangement algorithm library for providing a plurality of rearrangement algorithms to be listed by said rearrangement definition description; and rearrangement means for, upon receipt of the analyzed description of the rearrangement definition, taking out a rearrangement algorithm specified in the analyzed description of the rearrangement definition from said rearrangement algorithm library and executing the rearrangement algorithm when said completion time prediction means predicts that the deadline is not kept in some task within the workflow operation.

2. A workflow system as set forth in claim 1, wherein said workflow operation/control means, upon detecting a delay in a task, specifies the task and transfers to the operation by said rearrangement means.

3. A workflow system as set forth in claim 1, further comprising:

organization state store/control means for holding achievement goals relative to the workflow operation/control means, receiving information on the progress from said workflow operation/control means, making a comparison between information on the progress and the achievement goals, and controlling an achievement condition of the workflow operation, wherein said rearrangement definition description includes a list of workflow rearrangement algorithms to be executed when the achievement goals are not achieved, said organization state store/control means, when predicting that it is difficult to accomplish achievement goals, passing the goal name to said rearrangement means, then transferring to the operation by said rearrangement means, said rearrangement means taking out and executing a rearrangement algorithm specified in said rearrangement definition description from said rearrangement algorithm library.

4. A workflow system as set forth in claim 1, wherein when a plurality of rearrangement algorithms are specified together with their application order in the analyzed description of the rearrangement definition, said rearrangement means applies the plurality of rearrangement algorithms one after another in the specified order and finishes the operation at the success in one of the algorithms.

5. A workflow system as set forth in claim 1, wherein rearrangement algorithms provided by said rearrangement algorithm library include a rearrangement algorithm for, with respect to a task for which it is impossible to keep the deadline, changing an executor of the task to a substitute.

6. A workflow system as set forth in claim 1, wherein rearrangement algorithms provided by said rearrangement algorithm library include a rearrangement algorithm for, with respect to a task for which it is impossible to keep the deadline, extending the deadline of the task within a given range.

7. A workflow system as set forth in claim 1, wherein rearrangement algorithms provided by said rearrangement algorithm library include a rearrangement algorithm for, with respect to a task for which it is impossible to keep the deadline, raising the priority of the task.

8. A workflow system as set forth in claim 1, wherein rearrangement algorithms provided by said rearrangement algorithm library include a rearrangement algorithm for, with respect to a task for which it is impossible to keep the deadline, advancing the request time of the task within a given range so as to keep the deadline and, with respect to tasks prior to the task, rearranging to finish them by the request time of the task advanced so as to keep the deadline.

9. A workflow system for defining, operating, and controlling the procedure of business works and the flow of information on the business works, and further rearranging a workflow according to a progress of the work, for a workflow operation realized by a connection of a series of tasks to which a plurality of workers are charged with, comprising:

workflow definition means for generating a workflow definition based on various conditions including at least one of the content of the workflow operation, its order the deadline of each task, the name of a worker in charge and the priority;

workflow operation/control means for controlling the progress of the workflow operation according to the workflow definition generated by said workflow definition means and pressing each worker for the execution of the task; and workflow estimation/prediction means for, upon receipt of the workflow definition and the progress, predicting the future progress of the workflow operation, wherein the workflow definition generated by said workflow definition means includes a rearrangement definition description having a list of workflow rearrangement algorithms to be executed when it is predicted that the deadline of task assigned to a worker is not kept, and wherein said workflow estimation/prediction means further includes:
  task finish time inquiry means for examining a finish prediction time of each task;
  completion time prediction means for predicting a completion time of the workflow operation by the use of examination results from said task finish time inquiry means;
  definition analytical means for analyzing the rearrangement definition description defined by said workflow definition means and supplying an analyzed description of the rearrangement definition;
  a rearrangement algorithm library for providing a plurality of rearrangement algorithms to be listed by said rearrangement definition description; and
  rearrangement means for, upon receipt of the analyzed description of the rearrangement definition, taking out a rearrangement algorithm specified in the analyzed description of the rearrangement definition from said rearrangement algorithm library and executing the rearrangement algorithm when said completion time prediction means predicts that the deadline is not kept in some task within the workflow operation, and wherein rearrangement algorithms provided by said rearrangement algorithm library include a rearrangement algorithm for, with respect to a task for which it is impossible to keep the deadline, advancing the request time of the task within a given range so as to keep the deadline and, with respect to tasks prior to the task, applying geometric reduction to the working period so as to finish them by the request time of the task advanced so as to keep the deadline.

10. A workflow system as set forth in claim 1, wherein rearrangement algorithms provided by said rearrangement algorithm library include a rearrangement algorithm for, with respect to a task for which it is impossible to keep the deadline, informing the occurrence of a problem to a workflow management person.

11. A workflow system for defining, operating, and controlling the procedure of business works and the flow of information on the business works, and further rearranging a workflow according to a progress of the work, for a workflow operation realized by a connection of a series of tasks to which a plurality of workers are charged with, comprising:

workflow definition means for generating a workflow definition based on various conditions including at least one of the content of the workflow operation, its order the deadline of each task, the name of a worker in charge, and the priority;

workflow operation/control means for controlling the progress of the workflow operation according to the workflow definition generated by said workflow definition means and pressing each worker for the execution of the task; and workflow estimation/prediction means for, upon receipt of the workflow definition and the progress, predicting the future progress of the workflow operation, wherein the workflow definition generated by said workflow definition means includes a rearrangement definition description having a list of workflow rearrangement algorithms to be executed when it is predicted that the deadline of task assigned to a worker is not kept, and wherein said workflow estimation/prediction means further includes:

task finish time inquiry means for examining a finish prediction time of each task;

completion time prediction means for predicting a completion time of the workflow operation by the use of examination results from said task finish time inquiry means;

definition analytical means for analyzing the rearrangement definition description defined by said workflow definition means and supplying an analyzed description of the rearrangement definition;

a rearrangement algorithm library for providing a plurality of rearrangement algorithms to be listed by said rearrangement definition description; and rearrangement means for, upon receipt of the analyzed description of the rearrangement definition, taking out a rearrangement algorithm specified in the analyzed description of the rearrangement definition from said rearrangement algorithm library and executing the rearrangement algorithm when completion time prediction means predicts that the deadline is not kept in some task within the workflow operation, and wherein rearrangement algorithms provided by said rearrangement algorithm library include a rearrangement algorithm for setting the deadline of the last task of the workflow operation at a specified time and applying geometric reduction to the working period of a series of tasks from the task currently operating to the last task.

12. A workflow system as set forth in claim 1, wherein said workflow definition means provides an interface capable of specifying each rearrangement algorithm, with the key words of natural languages to express its characteristic over the workflow operation, as means for specifying each rearrangement algorithm provided by said rearrangement algorithm library.

13. A workflow system as set forth in claim 1, wherein said workflow definition means provides an interface capable of specifying a plurality of rearrangement algorithms together with the application order as means for specifying each rearrangement algorithm provided by said rearrangement algorithm library.

14. A workflow management method for defining, operating, and controlling the procedure of business works and the flow of information on the business works, and further rearranging a workflow according to a progress of the work, for a workflow operation realized by a connection of a series of tasks to which a plurality of workers are charged with, comprising the steps of:

a) a step of generating a workflow definition based on various conditions including at least one of the content of the workflow operation, its order, the deadline of each task, the name of a worker in charge, and the priority;

b) a step of controlling the progress of the workflow operation according to the workflow definition generated by said workflow definition step and pressing each worker for the execution of the task; and c) a step of, upon receipt of the workflow definition and the progress, predicting the future progress of the workflow operation, wherein the workflow definition generated by said workflow definition step a) includes a rearrangement definition description having a list of workflow rearrangement algorithms to be executed when it is predicted that the deadline of a task assigned to a worker is not kept, and wherein said step c) further includes:

a step of examining a finish prediction time of each task;

a step of predicting a completion time of the workflow operation by the use of examination results from said task finish time inquiry step;

a step of analyzing the rearrangement definition description defined by said workflow definition step and supplying an analyzed description of the rearrangement definition; and a step of, upon receipt of the analyzed description of the rearrangement definition, taking out a rearrangement algorithm specified in the analyzed description of the rearrangement definition from a rearrangement algorithm library for providing a plurality of rearrangement algorithms to be listed by said rearrangement definition description, and executing the rearrangement algorithm when it is predicted in said completion time prediction step that the deadline is not kept in some task within the workflow operation.

15. A workflow management method as set forth in claim 14, wherein said step b), upon detecting a delay in a task, specifies the task and transfers to the operation by said executing step of the rearrangement algorithm.

16. A workflow management method as set forth in claim 14, further comprising d) a step of holding achievement goals relative to the workflow operation, receiving information on the progress from said step b), making a comparison between the information on the progress and the achievement goals, and controlling an achievement condition of the workflow operation, wherein said rearrangement definition description includes a list of workflow rearrangement algorithms to be executed when the achievement goals are not achieved, said step d), when predicting that it is difficult to accomplish achievement goals, passing the goal name to said executing step of the rearrangement algorithm, then transferring to the operation by said executing step of the rearrangement algorithm, said executing step of the rearrangement algorithm taking out and executing a rearrangement algorithm specified in said rearrangement definition description from said rearrangement algorithm library.

17. A workflow management method as set forth in claim 14, wherein when a plurality of rearrangement algorithms are specified together with their application order in the analyzed description of the rearrangement definition, said executing step of the rearrangement algorithm applies the plurality of rearrangement algorithms one after another in the specified order and finishes the operation at the success in one of the algorithms.

18. A computer readable memory having a computer program for controlling a workflow system for defining, operating, and controlling the procedure of business works and the flow of information on the business works, and further rearranging a workflow according to a progress of the work, for a workflow operation realized by a connection of a series of tasks to which a plurality of workers are charged with, said computer program comprising the steps of:

a) a step of generating a workflow definition based on various conditions including at least one of the content of the workflow operation, its order, the deadline of each task, the name of a worker in charge, and the priority;

b) a step of controlling the progress of the workflow operation according to the workflow definition generated by said workflow definition step and pressing each worker for the execution of the task; and c) a step of, upon receipt of the workflow definition and the progress, predicting the future progress of the workflow operation, wherein the workflow definition generated by said workflow definition step a) includes a rearrangement definition description having a list of workflow rearrangement algorithms to be executed when it is predicted that the deadline of a task assigned to a worker is not kept, and wherein said step c) further includes:

a step of examining a finish prediction time of each task;

a step of predicting a completion time of the workflow operation by the use of examination results from said task finish time inquiry step;

a step of analyzing the rearrangement definition description defined by said workflow definition step and supplying an analyzed description of the rearrangement definition; and a step of, upon receipt of the analyzed description of the rearrangement definition, taking out a rearrangement algorithm specified in the analyzed description of the rearrangement definition from a rearrangement algorithm library for providing a plurality of rearrangement algorithms to be listed by said rearrangement definition description, and executing the rearrangement algorithm when it is predicted in said completion time prediction step that the deadline is not kept in some task within the workflow operation.

19. A computer readable memory as set forth in claim 18, wherein said step b), upon detecting a delay in a task, specifies the task and transfers to the operation by said executing step of the rearrangement algorithm.

20. A computer readable memory as set forth in claim 18, further comprising:

d) a step of holding achievement goals relative to the workflow operation, receiving information on the progress from said step b), making a comparison between the information on the progress and the achievement goals, and controlling an achievement condition of the workflow operation, wherein said rearrangement definition description includes a list of workflow rearrangement algorithms to be executed when the achievement goals are not achieved, said step d), when predicting that it is difficult to accomplish achievement goals, passing the goal name to said executing step of the rearrangement algorithm, then transferring to the operation by said executing step of the rearrangement algorithm, said executing step of the rearrangement algorithm taking out and executing a rearrangement algorithm specified in said rearrangement definition description from said rearrangement algorithm library.

21. A computer readable memory as set forth in claim 18, wherein when a plurality of rearrangement algorithms are specified together with their application order in the analyzed description of the rearrangement definition, said executing step of the rearrangement algorithm applies the plurality of rearrangement algorithms one after another in the specified order and finishes the operation at the success in one of the algorithms.

* * * * *